Feb. 21, 1933.                J. J. AULL                1,898,519
                        DETACHABLE VALVE MEMBER
                          Filed Jan. 6, 1930
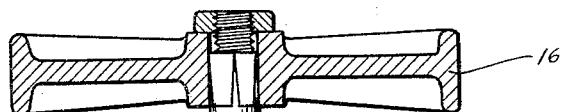
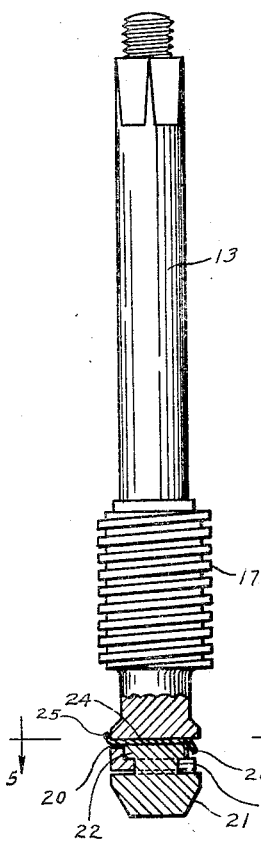
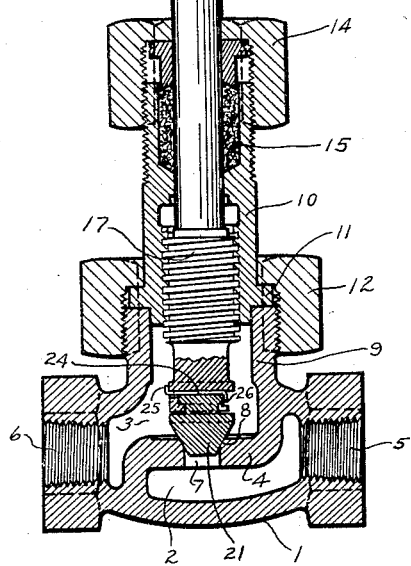
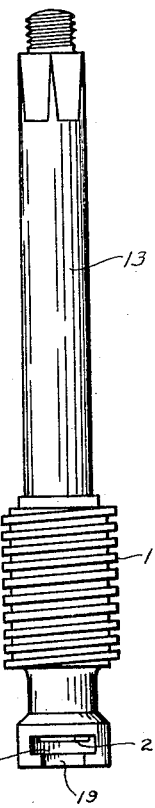
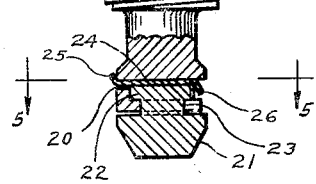
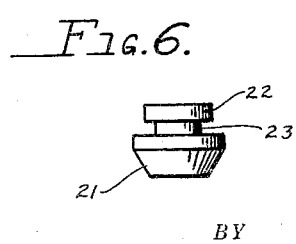
INVENTOR
Jerome J. Aull.
BY
Toulmin + Toulmin
ATTORNEY Patented Feb. 21, 1933

1,898,519

UNITED STATES PATENT OFFICE

JEROME J. AULL, OF CINCINNATI, OHIO, ASSIGNOR TO THE LUNKENHEIMER COMPANY, OF CINCINNATI, OHIO, A CORPORATION OF OHIO

DETACHABLE VALVE MEMBER

Application filed January 6, 1930. Serial No. 418,876.

This invention relates to an improvement in valves and has for its object the provision of a valve member detachably located on the inner end of the valve stem.

It is also an object of this invention to provide, in connection with a removable valve member, means whereby the member may be detachably connected to the valve stem and be readily removed therefrom.

It is also an object of this invention to provide, in connection with a valve member of this type, members that are easily manufactured, readily assembled and when assembled are effective for accomplishing the purposes for which they are intended.

This valve is particularly well adapted for use in connection with liquids that are likely to corrode or pit the valve and thereby cause the valve to leak.

There is shown in the accompanying drawing a preferred embodiment of this valve.

Referring to the drawing:

Figure 1 is a longitudinal section along the valve stem, showing the valve casing and the valve member in section.

Figure 2 is a view of the valve stem with the end and the valve member attached thereto in section.

Figure 3 is a view of the valve stem showing the socket and the slot therein for receiving and holding the valve member.

Figure 4 is a view of the lower end of the valve stem with the valve member attached thereto.

Figure 5 is a section on the line 5—5 of Figure 2.

Figure 6 is a side view of the valve member.

In Figure 1 there is shown the valve member, the subject-matter of this invention, in connection with a valve stem and a valve.

The valve casing is indicated by the numeral 1 and has therein two chambers 2 and 3. These chambers are separated by a partition 4. In chamber 2 there is a screw threaded pipe connection 5, and in the chamber 3 there is a screw threaded pipe connection 6. By means of these connections the valve casing may be attached to pipes that convey the liquid.

In the partition 4 there is a passageway 7 which has around the upper marginal surface thereof a valve seat 8. Extending from one side of the casing 1 is a circular and more or less cylindrical projection 9 which is screw threaded. Resting on the outer end of this projection 9 is a valve stem guide 10, which has extending from one end thereof a shoulder 11 which rests upon the outer end of the projection 9. For the purpose of holding the valve stem guide seated upon the projection 9 there is a threaded cap 12 which engages the threads upon the projection 9 and holds the valve stem guide in rigid engagement with the casing.

Extending through the valve stem guide is a valve stem 13. This stem is surrounded intermediate the ends thereof by a cap member 14, which is screw threaded internally and adapted to be screw threaded onto the outer end of the valve stem guide 10. Within the cap member 14 and the outer end of the valve stem guide 10 there is a cavity for a packing 15. On the outer end of the valve stem is a handle 16 suitably attached to the stem, by which the stem is rotated.

Near the inner end of the valve stem there are threads 17 which engage similar threads internally located on the valve stem guide 10. The purpose of these threads is to seat and unseat the valve by the rotation of the stem through the handle 16. At the inner end and on one side of the valve stem there is a U-shaped socket 18. The extreme lower end of the valve stem is cut away forming an opening, somewhat U-shaped, indicated by the numeral 19, which provides a shoulder just beneath the socket for supporting a head on the valve member. Extending through the back wall of the socket member there is a slot 20. This slot 20 and the socket constitute an opening entirely through the inner end of the valve stem.

The valve member is indicated by the numeral 21 and has thereon a head 22 connected to the member by a neck 23. The head part of the valve member is adapted to be seated within the socket 18, and when thus seated the neck 23 fits within the opening 19, with the head resting upon the shoulder just beneath the socket 18. For the purpose of holding the valve member seated in the lower end of the valve stem there is provided a metal key 24 which extends through the upper part of the socket and through the slot 20. One end of this key is bent up in engagement with the valve stem and indicated by the numeral 25. The other end 26 is bent down in engagement with the head so that the valve member is locked seated in the lower end of the valve stem.

The parts are shown assembled in Figure 2. All that is necessary to assemble the valve member on the lower end of the valve stem is that the head part be slit and inserted within the socket 18, and in order to prevent the removal or displacement of the valve member from the end of the valve stem there is provided this key 24, which is slipped through the slot 20 and one end bent up and the other down so that the valve member is held in position just as long as the key is thus maintained. In order to remove the valve member the parts 25 and 26 are straightened and the key slipped out of the slot and socket. Then the valve member may be easily removed from the socket and replaced by another one that is new and unworn. It is obvious from this description that the valve member thus connected to the valve stem may be easily removed and replaced by a new and perfect valve member that will properly seat with the valve seat.

I desire to comprehend within my invention such modifications as may be clearly embraced within my claims and the scope of my invention.

Having thus fully described my invention, what I claim is new and desire to secure by Letters Patent, is:

1. In a valve structure, a valve stem having a shouldered socket in one end, a valve member having a head thereon adapted to fit in said socket and rest upon said shoulder, and means cooperating with the stem to engage the head on its top and one side to hold said head on said shoulder and thereby detachably hold the valve member on said stem.

2. In a valve structure, a valve stem having in one end a U-shaped socket, the end of said stem being cut away to form a U-shaped shoulder for said socket, a valve member having a neck and head, said neck adapted to fit in said cutaway part with the head in said socket on said shoulder whereby the valve member may be removably attached to said stem, and means engaging said stem and over and to one side of said head to hold the head in said slot.

3. In a valve structure, a valve stem having in one end a socket, the back wall of said socket having a slot therein, the end of said stem being cut away to form a shoulder for said socket, a valve member having means thereon to fit in said socket and rest on said shoulder whereby the valve member may be removable attached to said stem, and a key member extending through said slot and socket across the valve member and bent down on one side of the valve member to removably lock said valve member against lateral movement on the valve stem.

4. In a valve structure, a valve stem having in one end a U-shaped socket, the back wall of said socket having a slot therethrough, the end of said stem being cut away to form a U-shaped shoulder for said socket, a valve member having a neck and head, said neck adapted to fit in said cutaway part with the head in said socket on said shoulder whereby the valve member may be removably supported by said stem, and a key member in said socket and slot across the valve member and bent down on one side of the valve member to hold said head against lateral movement in said socket.

5. In a valve structure, a valve stem having in one end a socket, the back wall of said socket having a slot therethrough, the end of said stem being cut away to form a shoulder for said socket, a valve member having a neck and head, said neck adapted to fit in said cutaway part with the head in said socket on said shoulder whereby the valve member may be removably supported by said stem, and a key member in said slot and socket bent up at one end to engage the stem and bent down at the other end to engage said head to lock the valve member to the stem.

6. In a valve member, a stem, a detachable valve member, and a bendable key member therebetween bent at one end to engage the stem and bent at the other end to engage the valve member.

7. In a valve member, a stem having a socket therein, a detachable valve member adapted to be supported by said stem in said socket and a key member to hold the valve member in the socket, said key member having one end bent to engage the stem and the other end bent to engage the valve member.

8. In a valve member, a stem having a socket therein, a detachable valve member having a part to engage the socket, and a key member on said stem adapted to be bent to engage said part to hold said part in the socket.

9. In a valve member, a stem having a socket and a shoulder on the stem on each side of the socket, a detachable valve member having a head thereon adapted to fit in the socket and rest on the shoulders, and a key member supported by the stem on top of the head, said key member being bent down on one side of the head to hold the valve member on the stem.

In testimony whereof I affix my signature.

JEROME J. AULL.